United States Patent Office 2,932,620
Patented Apr. 12, 1960

2,932,620

PROCESS FOR PREPARING CATALYSTS UTILIZING ALUMINA IN THE CARRIERS

Wilhelm von Fuener and Willi Oettinger, Ludwigshafen (Rhine), Ortwin Reitz, Heidelberg, and Ernst Lorenz, Ludwigshafen (Rhine), Germany, assignors to Badische Anilin- & Soda-Fabrik Aktiengesellschaft, Ludwigshafen (Rhine), Germany No Drawing. Application March 14, 1955
Serial No. 494,246

Claims priority, application Germany March 20, 1954

7 Claims. (Cl. 252—465)

This invention relates to a new and improved method of preparing catalysts with alumina in the carrier, said catalysts being useful in treating hydrocarbons in the presence of hydrogen.

It is already known to use, for the pressure hydrogenation of hydrocarbons as well as the dehydrogenation, reforming, isomerizing, refining and cracking in the presence of hydrogen, preferably under pressure, in particular in the gas phase, at temperatures of 200° to 600° C., catalysts which consist of alumina and are provided with small amounts of substances having catalytic activity. These aluminas are generally speaking prepared by the addition of a precipitant to an aluminum salt solution.

We have now found that a specially active catalyst for the said reactions is obtained by using as the carrier therefore an alumina in the preparation of which a flowing aluminum salt solution is broughtt together with a flowing precipitant with simultaneous intimate mixing, preferably at raised temperature, care being taken that the precipitated aluminum hydroxide does not come intó contact with the initial substances in order to prevent further hydroxide from being precipitated on the aluminum hydroxide particles once they have been formed. The aluminum hydroxide is then washed, dried and heated, if desired after any liquid present has been separated.

As aluminum salts there are used acid salts, in particular the water-soluble halides, sulfates, nitrates, phosphates or salts of low molecular weight organic acids, such as acetates or formates. Caustic soda or caustic potash solutions may be used for the precipitation of these salt solutions. It is advantageous, however, to use ammoniacal precipitants, such as solutions of ammonia, ammonium sulfide or ammonium carbonate. The precipitation is carried out at a pH value between 7 and 11. When working at raised temperature it is preferable to select one above about 40° C., advantageously between 70° and about 95° C.

In accordance with the present invention, the two streams of aluminum salt solution and alkaline precipitant are not introduced as hitherto into a large vessel in which the precipitate remains for some time and comes into contact with the solutions of aluminum salt and precipitant flowing in subsequently, but the two streams are brought together so that a precipitation takes place in the narrowest possible space, the precipitate being removed as quickly as possible and subjected to further treatment, such as washing or drying.

For example the precipitation may be effected in a nozzle which is preferably of conical shape and formed with double walls. One stream flows through the inner opening and the other stream through the outer jacket. The two streams leave at the front opening, as for example the point of the cone. By their striking together there is formed a precipitate which is led away so that it has no opportunity of encountering the initial solutions. Thus the precipitation chamber consists solely of the nozzle opening. It is also possible to bring together the ends of two pipes through which the solutions flow, so closely, for example at an angle of 15° to 180° C., that the effluent solutions come into intimate contact and a precipitation takes place immediately. A short tube, having a short mixing region, can also be used, the product produced leaving the short tube immediately after its formation. Injectors can also be used, the one solution be passed through the central tube and the effluent stream entraining the other solution. The vessel in which the injector is situated is kept so small that the aluminum hydroxide precipitated leaves the vessel very rapidly. Turbo-mixers, such as have been proposed for the production of emulsions, are also especially well suited for the purpose.

With the aid of the apparatus above described, the precipitation can be carried out very rapidly and the precipitate formed can also be withdrawn after the shortest possible residence time in the reaction vessel. For catalytic action it is of special importance that the rapidly precipitated gel particles are not further increased in size by the flowing solutions of the initial materials, such as is the case for example in a conventional precipitation vessel where in the presence of the primary particles first formed newly precipitated aluminum hydroxide is always being deposited as a layer around the primary particles so that the particles have time to change in their structure. Therefore when working according to the present invention the vessels are preferably kept as small as possible so that the particles of the precipitated product do not come into contact again with the initial materials. As far as possible, the particles of aluminum hydroxide should also not be left for too long in a collecting vessel. A rapid working up, or a marked change in temperature in the collecting vessel as compared with the precipitation temperature is recommended.

The reaction product obtained from the aluminum salt solution can be filtered off immediately after its production and advantageously washed several times. Generally speaking ammoniacal water is first used and a changeover to hot water occurs later. The precipitate can also be stirred several times with water, filtered and again washed until practically no acid is contained therein.

It is especially preferred not to filter the pasty precipitate formed by the precipitation, but to heat it previously for some time, as for example ½ to 2 hours, at about 100° C. The product can also be heated under pressure, for example at 2 to 30 atmospheres or more. The moisture is removed by releasing the pressure and the product removed from the pressure vessel.

The washed alumina can then be introduced into a conventional catalyst carrier mould, as for example supplied to an extrusion press or pill press, in order to impart thereto the shape, for example, of small pills. The product may, however, also be converted into the granulated condition. By spraying the pasty product, the alumina can be given the form of small beads.

After shaping, it is preferably first dried for one or more hours, as for example 2 to 8 hours, at 80° to 100° C. and then at 120° to 200° or 250° C. for 1 to 5 hours. Then the temperature is raised to 350° to 450° C. for several hours, as for example 2 to 15 hours. The calcination temperature usually lies still higher, as for example at 500° to 700° C. and the calcination is carried out for 2 to 10 hours.

In the case of aluminas which have been prepared from acid aluminum salts, of for example from aluminum sulfate, it is preferable, after drying at 85° to 125° C., to carry out again a washing with ammoniacal water, preferably at raised temperature, in order to remove the acid residue. The washed product is then dried and calcined. The carrier is advantageously treated with gases, such as ammonia, hydrogen, sulfur dioxide, halogen or rare gases, and the gas can remain in the pores. The carrier can also be pretreated with hydrogen halide or an inorganic or low molecular weight organic monobasic or dibasic acid. There may be mentioned for example hydrogen chloride, hydrogen fluoride or chlorsulfonic acid, formic acid or oxalic acid. The carrier can absorb halogen or merely be etched therewith. Part, as for example 2 to 10%, of the alumina can be brought into solution with acid or an acid salt solution, and the resultant paste can then be shaped and heated. The paste can also be produced by the addition, for example, of an aluminum salt solution, such as aluminum chloride solution.

The advantage of the alumina carrier thus obtained consists in the facts that it has a high bulk density, a large inner surface and large pore volume and renders the finished catalyst very active.

For the preparation of the catalyst, the carrier prepared by one of the methods described is impregnated with a solution of one or more compounds of metals of the 5th to 7th groups of the periodic system as well as the iron, platinum and palladium groups, as well as the heavy metals of the 1st group, such as copper, silver and gold, and also zinc, magnesium, cadmium, zirconium, titanium, tin, lead, antimony and bismuth. By heating to 100° to 300° C. for about 1 to 2 hours or more, the compound of the chosen metal is decomposed. Then the catalyst is heated for several hours at 400° to 600° C. The corresponding metal or metal oxide is then present on the carrier. By aftertreatment with volatile sulfur or halogen compounds, preferably under pressure, the sulfides or halides can be prepared.

For the catalytic reactions above described, there may be mentioned especially the compounds, as for example the oxides, sulfides, selenides, tellurides, borates, nitrates, carbonates, halides, phosphorus compounds or also silicates of vanadium, molybdenum, tungsten, chromium, uranium, rhenium, iron, nickel or cobalt as well as gold, silver, copper, tin, titanium, lead, zinc and manganese as well as metals of the platinum, palladium and iron groups and the heavy metals of the 1st group or mixtures of these. Thus the said compounds of molybdenum, tungsten, chromium and vanadium can be used in admixture or in chemical combination with compounds of nickel, cobalt, titanium, tin or lead and/or with the metals of the platinum and palladium group and/or heavy metals of the 1st group and their compounds, the added substances preferably being used in smaller amounts than the molybdenum, tungsten, chromium and vanadium. Some elements are suitable as promoters for the most common catalysts of the 5th to 8th groups of the periodic system, as for example, gold, silver, mercury, titanium, copper, zinc, tin and uranium and lead or their compounds. Mixtures consisting of the compounds of the said metals of the 4th group of the periodic system, as for example titanium, with the compounds of iron, nickel, cobalt or manganese as well as those of copper, silver, gold, platinum, palladium, ruthenium or their compounds are also suitable. There may also be mentioned the compounds of the metals of the iron group in admixture with platinum, palladium, ruthenium, copper, silver, gold or their compounds. These mixtures can also be present in the form of chemical compounds. The activity of the catalysts can be adjusted with compounds of the alkali and alkaline earth metals, because these influence the activity. The said metals and metal compounds can also be added before the shaping of the alumina by mixing the two components in a mixer, kneader or a ball mill and then drying and calcining them. The finished catalyst contains as a rule 1 to 30% or more of the abovementioned metals.

It is also possible, during the precipitation of the alumina from an aluminum salt solution and the precipitant, to add continuously a second metal salt solution of one of the above-mentioned metals so that a product is precipitated in which the metal is combined with the alumina. However silicic acid, silicates, bleaching earths, graphite or gels, such as silica gel, titania gel or iron gel, can also be added. A waterglass solution can also be introduced, so that during the preparation of the alumina, silicic acid is also precipitated. In some cases it may be advantageous for the alumina to contain 1 to 30%, in particular 3 to 20%, of silicic acid or silicates. These aluminas can also serve as carriers.

The catalyst can then be used according to this invention for the cracking, refining or aromatising pressure hydrogenation of hydrocarbons. As initial materials there may be used petroleums, tars, shale oils and their fractions, and also cracking, hydrogenation and extraction products, in particular gasolines and middle oils, as well as the reduction products of carbon monoxide and polymerisation products of olefines.

By pressure hydrogenation we mean the treatment of the said initial materials with hydrogen or gases containing hydrogen, such as illuminating gas, coke oven gas, cracking gas or low temperature carbonisation gas, at temperatures of about 200° to 600° C. and under high pressures of 150 to 1000 atmospheres, in particular 200 to 700 atmospheres, or low pressures of 5 to 150 atmospheres, as for example 10 to 120 atmospheres, advantageously 10 to 70 atmospheres. Amounts of 50 to 5000 litres, as for example 100, 250, 300, 500, 700, 1000 or 2000 litres, of hydrogen per kilo of initial material per hour and throughputs of 0.1 to about 10 parts by volume of initial material for each part by volume of reaction space per hour are chosen.

The initial material can be allowed to trickle down through a reaction vessel in the form of a tower which is filled with pieced catalyst. The gas containing hydrogen can be led in co-current with or counter-current to the initial material. The initial material can also be moved through the reaction vessel upwardly with the hydrogenation gas. The hydrogenation gas can also be introduced at various points of the reaction vessel. The catalyst can also be arranged on sieves in stories in the vessel so that spaces free from catalyst are present between the stories in which the supply pipes for the initial material and/or hydrogenation gas can open.

The catalyst can also be used for improving gasolines or middle oils, for example for increasing the octane rating, by reforming in the presence of hydrogen, dehydrogenation of naphthenes, cyclisation of paraffinic hydrocarbons, removal of sulfur, oxygen and/or nitrogen compounds and isomerisation of paraffinic hydrocarbons, lower pressures, as for example 2 to 70, in particular 5 to 50, as for example 7 to 20 or 40, atmospheres, and temperatures of 250° to 500° C., in particular 330° to 450° C. being used. In this case also the abovementioned metals, metal compounds or mixtures, as for example the oxides of the metals of the 5th and 6th groups as well as the metals of the platinum and palladium groups as well as copper, silver, gold and titanium and their compounds or mixtures of these with platinum or palladium can similarly be used. In this way it is also possible to split off side chains, as for example alkyl groups, or compounds containing oxygen, sulfur or nitrogen for example, OH or $NH_2$ groups from cyclic compounds. In the case of reforming, dehydrogenation, dealkylation, cyclisation and refining, less hydrogen may be used; it is sufficient to return the hydrogen formed during the process, for example in an amount of 100 to 1000 litres per kilogram per hour, without adding extraneous hydrogen. The isomerisation or alkylation of hydrocarbons and the cracking of oils and fractions of the same in the presence of hydrogen under slightly increased pressure can also be advantageously carried out with the said catalysts. The said reactions can also be carried out in two or more reaction vessels which are arranged one behind another, preferably with increasing temperature. The volumes of catalyst can be different in the individual vessels and may, for example, increase or decrease. The amount of hydrogen can also be different in the individual vessels. It is possible to work with increasing or decreasing amounts of hydrogen. Part of the product obtained can also be separated between the individual vessels.

When working under pressures up to about 150 atmospheres, the catalyst is generally speaking reactivated from time to time with a gas containing oxygen at temperatures of 450° to 600° C. The catalyst or the catalyst carrier can also be exposed to a temperature above 400° C., as for example 500° to 600° C., for a long time before use.

The catalysts can be arranged rigidly in the reaction chamber in known manner. They can also be present in the reaction chamber in a moving state. The catalyst is also suitable for the reduction of carbon monoxide, hydrogenation of olefines and nitro groups and the polymerisation of olefines.

The following examples will further illustrate this invention but the invention is not restricted to these examples.

*Example 1*

9 kilograms of commercial aluminum sulfate with an aluminum oxide content of about 17 to 18% are dissolved in 18 litres of water and precipitated with aqueous ammonia (about 12%) in a nozzle under a pressure of 5 to 6 atmospheres at 70° C. The aluminum salt solution is supplied to the central bore of a double-walled nozzle, the ammonia solution flows through the outer annular chamber and mixes with the aluminum salt solution a short distance in front of the outlet from the nozzle. The precipitate is continuously removed from the nozzle the end part of which forms the precipitation chamber. The suspension containing the precipitate has a marked excess of ammonia and a pH value of 9 to 10. It is brought into a stirring vessel and there boiled up for 1 to 2 hours while stirring. The precipitate is then filtered, washed free from sulfate with warm ammoniacal water, spread out on sheets, dried first at room temperature and then for a long time at 80° to 100° C., washed free from sulfate with ammoniacal water, again dried for a long time at 80° to 100° C., heated for 1½ hours at 250° C. and then slowly heated during 15 hours to 450° C. and finally calcined for 5 hours at 600° C. 400 grams of the active alumina thus prepared are impregnated with 24 grams of nickel carbonate dissolved in dilute acetic acid, dried at 150° C., 36 grams of molybdic acid dissolved in ammonia added, dried and heated for 12 hours at 450° C. in the air.

A residue containing 4% of sulfur remaining in the distillation of Near Eastern crude oil is led together with 1.5 cubic metres of fresh and circulated hydrogen per kilogram of oil under a pressure of 300 atmospheres and at a temperature of 410° C. through a first reaction chamber which is charged with filler bodies having hollow spaces passing through the same. The free space between and within the filler bodies amounts to 67% of the total reaction space. In this way the ash contained in the distillation residue is separated. After leaving this chamber the mixture of oil, vapor and gas is cooled to 390° C. and led over the above-described, rigidly-arranged catalyst.

The catalyst loading amounts to 1.5 kilograms of residue per litre of catalyst per hour. The product leaving the high pressure chamber then contains only 1.15% of sulfur.

The catalyst may also contain cobalt instead of nickel. The molybdic acid may also be replaced by tungstic acid. The alumina may also be used with oxides or sulfides of molybdenum of tungsten or the metals of the 8th group alone.

*Example 2*

By the catalytic pressure hydrogenation of a distillation residue from Kuwait crude oil in the sump phase, a product is obtained which has a specific gravity of 0.815, 30% of constituents boiling up to 180° C., 0.9% of sulfur, 0.08% of nitrogen and a final boiling point of 360° C.

This sump phase product is led together with 2 cubic metres of hydrogen per kilogram of oil under a pressure of 200 atmospheres with a throughput of 1.0 kilogram per litre of catalyst per hour at 380° C. over a catalyst which is prepared as follows:

6 kilograms of commercial aluminum sulfate (with an $Al_2O_3$-content of about 17 to 18%) are dissolved in 12 litres of water. In a reaction vessel of about 400 cubic centimetres capacity, which is provided with a rapidly-rotating turbostirrer with about 3000 r.p.m., the aluminum sulfate solution and a 12% ammonia solution are supplied in a thin stream to the suction side of the turbomixer. The reaction is carried out at 80° C. and a pH of 8.5 to 9.0 measured with an antimony electrode. The precipitate formed in the form of a suspension is continuously removed from the small reaction vessel and heated in batches in a stirring vessel for two hours at 100° C. while stirring. The mass is then filtered, washed free from sulfate with warm ammoniacal water, subsequently washed with pure water, the pressed filter cake spread out on sheets, dried at 80° C., brought to a granulation of 4 to 6 millimetres, washed free from sulfate with warm ammoniacal water, dried for a long time at 80° C. to 100° C., gradually heated during 8 hours to 400° C. and calcined for several hours at 600° C.

The active alumina thus obtained is impregnated with molybdic acid in the form of ammonium molybdate solution, dried and the salt decomposed at 350° C. The finished catalyst contains 17% of molybdic acid.

The product obtained is free from sulfur and nitrogen and is then cracked to gasoline over synthetic aluminum silicate catalysts, if desired after separation of the gasoline.

*Example 3*

The filter cake described in Example 2 is plasticised by kneading and shaped in an extrusion press to strands 3 millimetres in diameter, cut into small cylinders, dried at 80° C., washed free from sulfate with warm ammoniacal water, dried, heated to 400° C. within 12 hours and calcined for several hours at 550° C. The calcined cylinders are impregnated with platinic chloride so that the finished catalyst contains 0.5% of platinum, brought first slowly to 250° to 300° C., kept at this temperature for 2 to 3 hours, then brought to 400° to 450° C. and kept for 3 to 4 hours at this temperature.

Over this catalyst there is led a gasoline fraction obtained from Near Eastern crude oil, which has a boiling commencement of 103° C., an end boiling point of 195° C. and an octane number of 35 according to the Research method, together with 2 cubic metres of circulated hydrogen per kilogram of gasoline fraction at 470° C. and under a pressure of 35 atmospheres. The catalyst loading is 2 kilograms of gasoline per litre of catalyst per hour.

The stabilised product obtained in a yield of 92% by weight has an octane number of 87 according to the Research method.

*Example 4*

22 litres of an aluminum nitrate solution with a 10% $Al_2O_3$ content is brought together with a 25% solution of ammonia in a reaction vessel of 400 cubic centimetres capacity which is provided with a rapidly-rotating turbomixer. The reaction proceeds at 90° C. and a pH value of 7.5. The suspension leaving the mixer is filtered. The precipitate is washed with ammoniacal water until nitrate ions can no longer be detected in the washing water. The precipitate is then slowly dried at 80° to 100° C. for 12 hours, a small amount of stearic acid is added and the whole formed into pills, heated and then calcined for several hours at 450° C. The pills are again washed with ammoniacal water and again calcined at 550° C.

The second washing can also be carried out after the drying or after the drying and heating to higher temperatures. Even when the precipitate is washed entirely free from acid after the filtration, it is still desirable when using acid aluminum salt solutions as initial materials to carry out a second washing after heating the precipitate formed at least after the drying to 80° to 120° C.; it can also be first carried out at higher temperature as in the foregoing example. The second washing ensures that acid residues can always be removed. For the activity of the alumina produced it is usually of importance that no acid residue from the initial solution, the acid aluminum salt solution, is contained therein. Even when alumina is later aftertreated with an acid, the acid residues should still be removed during the preparation. In many cases it has been observed that when using alumina as catalyst carrier, the applied catalytic substance, as for example the noble metals and the 6th group and other of the said metals and compounds, has a better activity when the alumina no longer contains acid residues from the initial solution.

1.3% of palladium is added to this alumina. Cyclohexane is led at 470° C. together with 1.7 cubic metres of hydrogen per kilogram of cyclohexane over this catalyst under a pressure of 25 atmospheres. Benzene is obtained in a yield of 85%.

The said alumina can also be provided with cobalt molydate or nickel sulfide-tungsten sulfide or other metal oxides or metal sulfides, and used for the desulfurisation of benzene, gasoline, kerosene and fractions of higher boiling point, a temperature of 380° to 450° C. and a pressure of 3 to 40 atmospheres being chosen and the hydrogen being supplied extraneously or formed during the reaction from the initial material and led in circulation.

*Example 5*

1,600 grams of commercial aluminum hydroxide with a content of 65% of $Al_2O_3$ and introduced into 6 litres of concentrated hydrochloric acid and stirred for 2 to 3 hours, the temperature thus rising to 85° C. 3 liters of water are then added. The slight residue which forms is filtered off. The aluminum chloride solution and a 12% ammonia solution are then continuously supplied to a small reaction vessel which is provided with a turbomixer. The reaction proceeds at 85° C. and a pH of 8.5 The suspension formed is filtered, washed and dried at 80° C. The dried precipitate is then washed with ammoniacal water until the filtrate is free from chlorine. The pulverulent precipitate is shaped into pills, heated during the course of 12 hours to 300° C. and then heated for some hours at 500° C.

The resulting alumina is then provided with 10% of nickel sulfide and tungsten sulfide. Cyclohexane is led over the catalyst thus prepared in an amount of 1 volume per volume of catalyst per hour together with 1.5 cubic metres of hydrogen per kilogram of cyclohexane under a pressure of 180 atmospheres at 405° C. and a reaction product is obtained which consists to the extent of 60% of methyl cyclopentane.

The alumina can also be used as catalyst carrier for the isomerization of paraffin-based or naphthene-based gasoline or cracking gasolines and the catalytically active components used may be oxides of molybdenum, vanadium, chromium or metal halides, as for example alkaline earth metal halides, halides of aluminum, antimony and/or titanium, if desired with alkali metal halides, or phosphorus halides.

What we claim is:

1. In a process for manufacture of catalytic compositions, the improvement which comprises bringing a flowing aluminum salt solution together with a flowing alkaline precipitant while simultaneously effecting the most intimate mixing possible, the resulting precipitated aluminum hydroxide being removed as quickly as possible from contact with the flowing reactants so that no further aluminum hydroxide is formed on that already precipitated, and heating the pricipitate for at least one-half hour at about 100° C.

2. A process according to claim 1 wherein the salt solution employed is an acidic aluminum salt solution and the precipitation of aluminum hydroxide is carried out at a pH value between 7 and 11.

3. A process according to claim 1 wherein the precipitation of aluminum hydroxide is carried out at a temperature above about 40° C.

4. A process according to claim 1 wherein the washed, dried and precipitated product is rewashed with ammoniacal water, dried and then calcined by heating to a temperature of about 400° to about 700° C.

5. A process according to claim 1 wherein the catalyst is impregnated with 0.1 to 30% of at least one heavy metal of the 1st to 8th groups of the periodic system.

6. In a process for the manufacture of catalytic substances utilizing catalytically-active metal compounds carried by alumina, the improvement which comprises preparing the carrier by bringing a flowing aluminum salt solution together with a flowing alkaline precipitant while simultaneously effecting the most intimate mixing possible, the resulting precipitated aluminum hydroxide being removed as quickly as possible from contact with the flowing reactants so that no further aluminum hydroxide is formed on that already precipitated, heating the precipitate at least one-half hour at about 100° C., and thereafter washing, drying and calcining the precipitated product.

7. A method of preparing a carrier for catalysts comprising bringing a flowing aluminum salt solution together with a flowing alkaline precipitant while simultaneously effecting the most intimate mixing possible, the resulting preicpitated aluminum hydroxide being removed as quickly as possible from contact with the flowing reactants so that no further aluminum-hydroxide is formed on that already precipitated, heating the precipitate at least one-half hour at about 100° C., and thereafter filtering, washing, drying and calcining the precipitate.

References Cited in the file of this patent

UNITED STATES PATENTS

| 1,929,942 | Barclay | Oct. 10, 1933 |
| 2,258,111 | Engel | Oct. 7, 1941 |
| 2,443,285 | Webb et al. | June 15, 1948 |

UNITED STATES PATENT OFFICE
CERTIFICATE OF CORRECTION

Patent No. 2,932,620                               April 12, 1960

Wilhelm von Fuener et al.

It is hereby certified that error appears in the printed specification of the above numbered patent requiring correction and that the said Letters Patent should read as corrected below.

Column 2, line 67, for "of for example" read -- as for example --; column 7, line 34, for "molydate" read -- molybdate --; column 8, lines 29 and 30, strike out "washed, dried and" and insert the same after "product is" in line 30, same column.

Signed and sealed this 6th day of December 1960.

(SEAL)
Attest:

KARL H. AXLINE                                               ROBERT C. WATSON
Attesting Officer                                          Commissioner of Patents